United States Patent Office 2,929,853
Patented Mar. 22, 1960

2,929,853

PROCESS FOR THE PREPARATION OF METHYLENE COMPOUNDS OF LITHIUM AND MAGNESIUM

Karl Ziegler, Mulheim (Ruhr), Konrad Nagel, Krefeld, and Manfred Patheiger, Mulheim (Ruhr), Germany; said Nagel and said Patheiger assignors to said Ziegler No Drawing. Application April 2, 1956
Serial No. 575,303

Claims priority, application Germany April 6, 1955

9 Claims. (Cl. 260—665)

This invention relates to a process concerning the preparation of hitherto not known methylene compounds of lithium and magnesium by heating lithium methyl or magnesium dimethyl under exclusion of air. This effects the decomposition of the initial compounds and the formation of methane and of methylene compounds according to the two equations following below:

$$2LiCH_3 = Li_2CH_2 + CH_4 \quad (1)$$
$$Mg(CH_3)_2 = MgCH_2 + CH_4 \quad (2)$$

In the case of the lithium compounds, the required temperatures range from about 200° to 240° C., in the case of the magnesium compounds from about 220° to 260° C. The resulting, newly formed methylene compounds are both solid crystalline materials and insoluble in ether as well as in hydrocarbons. The compounds ignite when coming into contact with air, and burn vividly. When treated with water, alcohol, or other compounds containing active hydrogen atoms they will generate methane in proportions of ½ molecule methane per gram equivalent. Both methylene compounds are of a yellow to brownish color. The characteristic X-ray diagrams of the produced methylene compounds greatly differ from that of the known methyl compounds.

The conversion of the methyl compounds into methylene compounds can generally be accomplished through simple heating of the initial solid materials. The decomposition is somewhat facilitated when working in a vacuum. Because of the properties of the organo-metallic compounds, great care must be taken to exclude all air. In order to effect the conversion of the methyl compounds into methylene compounds, it is particularly advantageous to heat them in substantially liquid suspension agents, substantially inert to the methyl compounds. Such suitable suspension agent is, for example, a high-boiling diesel oil carefully distilled over sodium. Suspension agents with a lower boiling point, such as benzene, hexane, cyclohexane, or decahydronaphthalene may also be employed, if the heating process is carried out in an autoclave. Methylene compounds, more particularly magnesium methylene, are highly effective catalysts for the polymerization of ethylene. Polymerization takes place if the methylene compounds, preferably suspended in a hydrocarbon or a hydrocarbon mixture, are heated with ethylene to temperatures of 150° C. to 200° C. at pressures from 100 to 200 atmospheres. Other catalysts for the polymerization of ethylene or of other olefines may be obtained through combining the above mentioned methylene compounds with compounds of heavy metals, particularly of groups IV—B, V—B, VI—B, and VII—B, and a group VIII of the periodic system.

Example 1

12 grams of a solid, crystallized lithium methyl, recovered by reacting metallic lithium and methyl chloride in ether, and according to the analysis, contaminated with 4.45% of lithium chloride which could be separated only with difficulty, were fed into a piston in the presence of argon and heated to 240° C. in a metal bath under continuous mechanical agitation of the pulverized material. The gas formation ceased after a total period of 8 hours, at which time 5.7 liters of pure methane had been developed. The finely-powdered, sand-colored reaction product contained 6.7% of lithium chloride. This reaction product shows, upon decomposition with water, 46% lithium calculated from the lithium hydroxide obtained in the aqueous decomposition and titrated with acid. Pure lithium methylene contains a theoretical lithium content of 49.9%. The lithium methylene product obtained in this example has, as above pointed out, a lithium chloride content of 6.7% for which the organically bound lithium content calculates as 46.3% represented in the lithium hydroxide formed by the hydrolysis when decomposing the lithium methylene with water.

Example 2

A Fischer-Tropsch diesel oil with a boiling point of 250° C. to 255° C., completely liberated from olefines through respected hydrogenation, was purified of all traces of hydroxyl compounds by prolonged heating with metallic sodium and subsequent distillation. 34 grams of pure, crystallized magnesium dimethyl were added to 250 ccm. of such a pretreated suspension agent in the presence of purest argon. The piston was provided with a short pressure reflux condenser. The diesel oil was heated in a bath to the boiling point, and the methane escaped in a smooth stream, while the color of the originally white magnesium dimethyl simultaneously changed to yellow and then to a reddish brown. After 11 hours, the gas development ceased and 13.9 N-liters of methane were separated, i.e. 99.2% of the amount theoretically required for the formation of magnesium methylene. For further use of the magnesium methylene, the suspension obtainable in the above described manner is suitably used. In order to obtain a finer distribution of the magnesium methylene, the suspension may, if desired, be agitated for some time in a ball mill filled with nitrogen. For the purpose of analyzing the materials obtained as a result of the pyrolysis, the diesel oil was centrifugally separated in a nitrogen atmosphere, and the materials in the centrifugal washed a number of times with hexane, and finally dried. The resulting powder of an orange-brownish color contained 63.1% of magnesium, the theoretical magnesium content of magnesium methylene being 63.5%. By decomposing the product with water, the calculated amount of methane will be obtained.

What we claim is:

1. Process for the production of methylene compounds of a metal selected from the group consisting of lithium and magnesium which comprises heating a methyl compound selected from the group consisting of methyl compounds of lithium and methyl compound of magnesium in a substantially oxygen-free atmosphere to a temperature ranging from about 200 to 260° C. and recovering the methylene compound formed.

2. Process according to claim 1 in which said heating is effected with said methyl compound under a vacuum.

3. Process according to claim 1 in which said heating is effected with said methyl compound suspended in a substantially inert hydrocarbon.

4. Process according to claim 3 in which said hydrocarbon is a low boiling hydrocarbon maintained at a pressure above the vaporization pressure thereof at said heating temperature.

5. Process according to claim 4 in which said hydrocarbon is a member selected from the group consisting of benzene, hexane, cyclohexane and decahydronaphthalene.

6. Process according to claim 1 in which said heating is effected with said methyl compound in the presence of a high boiling diesel oil which has been distilled over sodium.

7. A methylene metal compound substantially of the general formula $MeCH_2$, in which Me is a member of the group consisting of $Li_2$ and Mg.

8. Compound according to claim 7, in which said group member is $Li_2$.

9. Compound according to claim 7, in which said group member is Mg.

References Cited in the file of this patent

Carothers et al.: Jour. Am. Chem. Soc., vol. 52, pp. 1254–59 (1930).

Yeddanapalli et al.: Jour. Chem. Phys., vol. 14, No. 1, January 1946, pages 1–7, (pages 4–5 only needed).

Sidgwick: "Chemical Elements and Their Compounds" (London), Oxford Univ. Press (1950) (pages 71–2 only needed).

West et al.: Jour. Org. Chem., vol. 18, pp. 1739–42 (1953).